US012504157B2

(12) United States Patent
Hierzer

(10) Patent No.: US 12,504,157 B2
(45) Date of Patent: Dec. 23, 2025

(54) ADAPTER FOR USE IN A TRACK LIGHTING SYSTEM, AND LIGHTING ARRANGEMENT

(71) Applicant: H4X e.U., Graz (AT)

(72) Inventor: Andreas Hierzer, Graz (AT)

(73) Assignee: H4X E.U., Graz (AT)

( * ) Notice: Subject to any disclaimer, the term of this patent is extended or adjusted under 35 U.S.C. 154(b) by 318 days.

(21) Appl. No.: 18/141,075

(22) Filed: Apr. 28, 2023

(65) Prior Publication Data

US 2023/0349542 A1 Nov. 2, 2023

(30) Foreign Application Priority Data

Apr. 29, 2022 (DE) ......................... 102022204265.4

(51) Int. Cl.

*F21V 21/35* (2006.01)
*F21V 23/06* (2006.01)
*H01R 13/436* (2006.01)
*H01R 25/14* (2006.01)

(Continued)

(52) U.S. Cl.

CPC .............. *F21V 21/35* (2013.01); *F21V 23/06* (2013.01); *H01R 13/436* (2013.01); *H01R 25/142* (2013.01); *H01R 31/06* (2013.01); *F21S 8/038* (2013.01)

(58) Field of Classification Search

None

See application file for complete search history.

(56) References Cited

U.S. PATENT DOCUMENTS 6,042,399 A 3/2000 Jaakkola
8,888,512 B2 * 11/2014 Hoffmeister ......... H01R 25/142 439/121

(Continued)

FOREIGN PATENT DOCUMENTS

CN 112856355 A * 5/2021 .............. F21V 21/35
DE 202016008190 U1 4/2017

(Continued)

OTHER PUBLICATIONS

Search report in corresponding EP23169087 dated Sep. 18, 2023 (pp. 1-2).

(Continued)

*Primary Examiner* — Tho D Ta

(74) *Attorney, Agent, or Firm* — Millen, White, Zelano & Branigan P.C.; William F. Nixon

(57) ABSTRACT

An adapter for use in a track lighting system is designed to be inserted into a track. The track has an electrical conductor means with conductors, the adapter has contact elements, and when the adapter is in an inserted state, contact can be made with the conductors by means of the contact elements. The contact elements can be moved into a contacting position, in which they protrude from the adapter so that they can be connected to the conductors, and into a non-contacting position, in which the adapter can be retracted into or removed from the track. The movement of the contact elements between the contacting position and the non-contacting position can be brought about by an operator by means of a moveably arranged actuating element of the adapter.

20 Claims, 4 Drawing Sheets

(51) Int. Cl.
*H01R 31/06* (2006.01)
*F21S 8/00* (2006.01)

(56) References Cited

U.S. PATENT DOCUMENTS

| | | | | |
|---|---|---|---|---|
| 8,899,999 | B2 * | 12/2014 | Mackiewicz | F21V 21/35<br>439/118 |
| 10,690,329 | B2 * | 6/2020 | Terumichi | F21V 23/007 |
| 2020/0403362 | A1 * | 12/2020 | Terumichi | H01R 35/04 |
| 2023/0045049 | A1 | 2/2023 | Stucchi | |

FOREIGN PATENT DOCUMENTS

| | | | |
|---|---|---|---|
| DE | 102020128275 | A1 | 4/2022 |
| EP | 3217090 | B1 | 12/2018 |
| EP | 4063723 | A1 | 9/2022 |
| WO | 1997034352 | A1 | 9/1997 |
| WO | 2021116930 | A1 | 6/2021 |

OTHER PUBLICATIONS

Office Action in corresponding German application 102022204265.4 dated Dec. 21, 2022 (pp. 1-10).
Office Action in corresponding Austrian application 50312/2022 dated Feb. 29, 2024 (1 page).

* cited by examiner

ADAPTER FOR USE IN A TRACK LIGHTING SYSTEM, AND LIGHTING ARRANGEMENT

FIELD OF THE INVENTION

The invention relates to the field of lighting arrangements, in particular for lighting purposes in buildings, for example in the interiors of buildings. The invention hereby relates in particular to the field of track lighting systems. The invention relates to an adapter for use in a track lighting system and a lighting arrangement with such an adapter.

TECHNICAL BACKGROUND

Track systems for lighting purposes are already known. For example, systems have already been proposed in which electrical conductors for the provision of a supply voltage are integrated into a track profile. Track lighting systems of this type can, for example, be light inserts of different types, such as spotlights or linear light inserts, wherein these inserts can also be combined.

For example, DE 10 2015 112 838 A1 describes a busbar with an essentially U-shaped profile that is open at the bottom and in which power lines run in a longitudinal direction. DE 10 2015 112 838 A1 describes an adapter which has a rotatable contact spring to establish contact with the power lines, wherein this contact spring is attached to a rotatable shaft and the shaft is rotatable by means of a tool.

However, this conventional method to establish contact with the conductors requires the use of a tool or, for example, at least a coin. This makes it relatively cumbersome to establish contact with or release the electrical contacts, particularly due to the fact that the tool needs to be kept available to use, may be forgotten or misplaced and needs to be picked up and put down repeatedly.

It would therefore be desirable to be able to use an adapter in a track lighting system in an even more convenient manner to make contact with the conductors of a track and also break the contact with these conductors.

SUMMARY OF THE INVENTION

Against this background, the invention is based on the object of proposing an adapter and a lighting arrangement whereby the adapter can be connected to conductors of a track more conveniently and easily, in particular without needing to increase the space required for the adapter to an undesirable extent.

According to the invention, this object is achieved by an adapter with the features of Claim 1 and/or by a lighting arrangement with the features of Claim 16.

Accordingly, an adapter for use in a track lighting system is proposed, wherein the adapter is designed to be inserted into a track of the track lighting system. The track has an electrical conductor means with conductors and the adapter has contact elements, and when the adapter is in an inserted state, contact can be made with the conductors by means of the contact elements. The contact elements can be moved into a contacting position, in which they protrude from the adapter so that they can be connected to the conductors, and into a non-contacting position, in which the adapter can be retracted into the track or removed from the track. According to the invention, an operator can control the movement of the contact elements between the contacting position and the non-contacting position by means of a moveably arranged actuating element of the adapter.

Furthermore, a lighting arrangement is proposed with a track, at least one lighting device or lighting module, and at least one such adapter for connection of the lighting device or lighting module to an electrical conductor means on the track.

One of the ideas on which the invention is based is to design a narrow and space-saving adapter while at the same time enabling convenient, simple actuation to move the contact elements between the contacting and non-contacting positions by using a moveable actuating element to achieve this motion, for example in the manner of a “slider”. The operator can manually shift the actuating element from a contacting position to an insertion/removal position with a simple movement, thereby bring the contact elements into the desired position with a simple manual movement. Instead of a a turning motion, the operator can easily apply force to the actuating element in the displacement direction. A moveable actuating element can also be arranged in a space-saving manner. In particular, this avoids the protrusion of the actuating element from an outer cross-section of the adapter in an undesirable way. As a result, a more space-saving and compact track lighting system can be implemented.

A lighting arrangement with an adapter of this type is compact and space-saving and can be installed particularly simply and rapidly and placed in an operational state.

Advantageous embodiments and developments of the invention are described in the further dependent claims and the description, with reference to the figures in the drawing.

In one embodiment, the adapter is designed for insertion into the track in such a way that, when the adapter is inserted, the conductors run laterally, in particular on both sides, of the adapter. Furthermore, it is intended that in the contacting position, the contact elements protrude laterally from the adapter. In particular, the conductors which can come into contact with the contact elements can be arranged parallel to one another. This can, for example, enable the appropriate accommodation of a number of conductors for different purposes, for example for power supply or for the supply of control signals, and their connection in a space-saving manner.

In particular, the actuating element used to move the contact elements can be actuated by the operator without any tools. It is therefore not necessary to carry a tool for assembly and no tools will be forgotten or mislaid.

In one embodiment, the adapter can be detachably fixed to the track by actuating the moveably arranged actuating element used to move the contact elements in an internal space of the track in which the adapter is accommodated in an inserted state, in particular at a selectable point in a longitudinal direction of the track, for example at any desired location. Thus, the adapter can be arranged in a practical, convenient and space-saving manner within the track, preferably freely positioned in the longitudinal direction of the track and fixed and subsequently released at a desired point along the track in a simple manner, in particular without using any tools. The moveable actuating element, which can also be referred to as a type of “slider”, therefore assumes an additional function within a fixing mechanism in order to mechanically fix the adapter, particularly in the contacting position, and to release the adapter, particularly in the non-contacting position.

In one embodiment, the actuating element can be moved in a straight line by the operator. The actuation is therefore easy and clear for the operator. This type of actuating element can easily be integrated into an elongate adapter, for example.

In one embodiment, the contact elements are arranged on a body that is rotatably mounted in a frame of the adapter. In this way it is possible to enable connection in a simple manner to a plurality of electrical conductors, and in particular to electrical conductors along both profile sides or legs of the track. The contact elements can thus be folded in and out of the adapter by means of the rotatable body.

In one embodiment, the body can be configured, for example, with an outer shape that is at least partially cylindrical or cylinder-like, wherein different outlines or outer shapes of the body are also alternatively conceivable. It is therefore possible to make the adapter particularly narrow and space-saving, for example by means of the cylindrical or cylinder-like shape.

The moveably arranged actuating element is in particular coupled to the body in such a way that the body can be rotated by moving the actuating element.

In a preferred embodiment, the actuating element can be moved relative to the frame of the adapter and the body can be rotated relative to the frame by means of the displacement movement of the actuating element.

In one embodiment, the actuating element has a flat, plate-shaped section, an engagement geometry formed on or in a first main surface area of the plate-shaped section and a guide contour formed in the area of a second main surface area of the plate-shaped section, which is opposite the first main surface area. Here, a steering projection arranged eccentrically relative to an axis of rotation of the body is embodied on an end face of the rotatably mounted body or on an element which is connected to the body in a torque-proof manner and arranged on the front side of the body. When the actuating element is moved, the guide contour acts on the steering projection, as a result of which the body can be rotated. Such a design of the body and actuating element thus enables the displacement movement of the actuating element to be converted into the rotational movement of the body in a simple manner and with only a few components.

In one embodiment, the engagement geometry embodied on or in the first main surface area of the plate-shaped section can be designed with a transverse rib projecting from the first main surface area. This can further facilitate efficient actuation by the operator.

In another embodiment, it is conceivable that the engagement geometry is designed with a depression in the first main surface area, in particular a transverse indentation. This can also contribute to saving installation space.

In further embodiments, it is in particular also conceivable for the transverse rib and the depression to be combined to form the engagement geometry.

In one embodiment, the actuating element is arranged in the region of an open surface of the adapter that faces an open side of the track when the adapter is in the inserted state. The actuating element is thus easily accessible when the adapter is inserted into the track.

In a preferred development, the actuating element is arranged flush or set back with respect to a flat surface that forms the outer surface of the adapter on a side of the adapter that faces the open side of the track. The actuating element or "slider" does not protrude from the cross-section of the adapter and therefore does not take up any additional space.

In a further embodiment, the conductors that can make contact with the contact elements are set up to provide an electrical supply voltage and/or a control signal for lighting devices or lighting modules of the track lighting system. Furthermore, the contact elements are designed to pick up the supply voltage or control signals from the conductors. This helps to achieve flexible lighting solutions and effects.

In a further embodiment, the adapter has a device for phase selection, by means of which an assembly which is or can be coupled to the adapter and which can in particular be a lighting device or a lighting module, which can be electrically coupled to supply the assembly, with an electrical phase selectable from a plurality of electrical phases provided by the electrical conductor means, with which the adapter is electrically coupled in the contacting position. This enables further increased flexibility when operating a lighting arrangement or a track lighting system that includes the adapter.

In one development, the adapter is set up to receive a control signal from the electrical conductor means by means of one or more of the contact elements and to interpret the control signal and control an assembly that is or can be coupled to the adapter, in particular a lighting device or a lighting module, as a function of the control signal and/or pass the control signal on to an assembly that is or can be coupled to the adapter, in particular a lighting device or a lighting module.

According to a further development, it can be provided that a length of the adapter, which is essentially parallel to a longitudinal direction of the track when the adapter is in the inserted state, is between 300 mm and 400 mm and/or that a height that is essentially parallel to a depth direction of the track when the adapter is in an inserted state, is between 20 mm and 40 mm and/or that a width of the adapter, which is measured essentially normal to the depth direction and the longitudinal direction of the track, for example when the adapter is inserted, is between 10 mm and 20 mm. For example, the length of the adapter can be approximately 356 mm, the height can be approximately 30 mm and the width can be approximately 14 mm. Other lengths, widths, and heights may also be advantageous and useful. Such an adapter is slim, space-saving and can be integrated into a narrow track.

In a further embodiment, the adapter is designed at least in sections with an asymmetrical shape in relation to a longitudinal center plane of the adapter in an outer surface area of the adapter that faces a base of the track when the adapter is inserted. This ensures that the adapter is inserted in the track with the correct alignment, particularly when it interacts with an inner surface area of the base of the track that at least in sections corresponds in some areas to the outer surface area of the adapter.

The embodiments and updated versions described above can be combined in any way where appropriate. Further possible embodiments, updated versions and implementations of the invention also include combinations of features of the invention described above or below with regard to the exemplary embodiments which are not explicitly mentioned. In particular, the person skilled in the art will also add individual aspects to the respective basic form of this invention as improvements or additions.

BRIEF DESCRIPTION OF THE DRAWINGS

The invention is explained in more detail below with reference to the exemplary embodiments shown in the figures of the drawings. The following are depicted.

The accompanying drawings are provided to clarify the embodiments of the invention. They illustrate the embodiments and, together with the description, serve to explain the principles and concepts of the invention. Other embodiments and many of the mentioned advantages will become apparent when consulting the drawings. The elements of the drawings are not necessarily shown at the same scale.

In the figures, elements, features and components which are identical and which have the same function and effect each have the same reference signs, unless otherwise stated.

DESCRIPTION OF EMBODIMENTS OF THE INVENTION

Figures 1A, 1B, 1C, 1D, 1E:
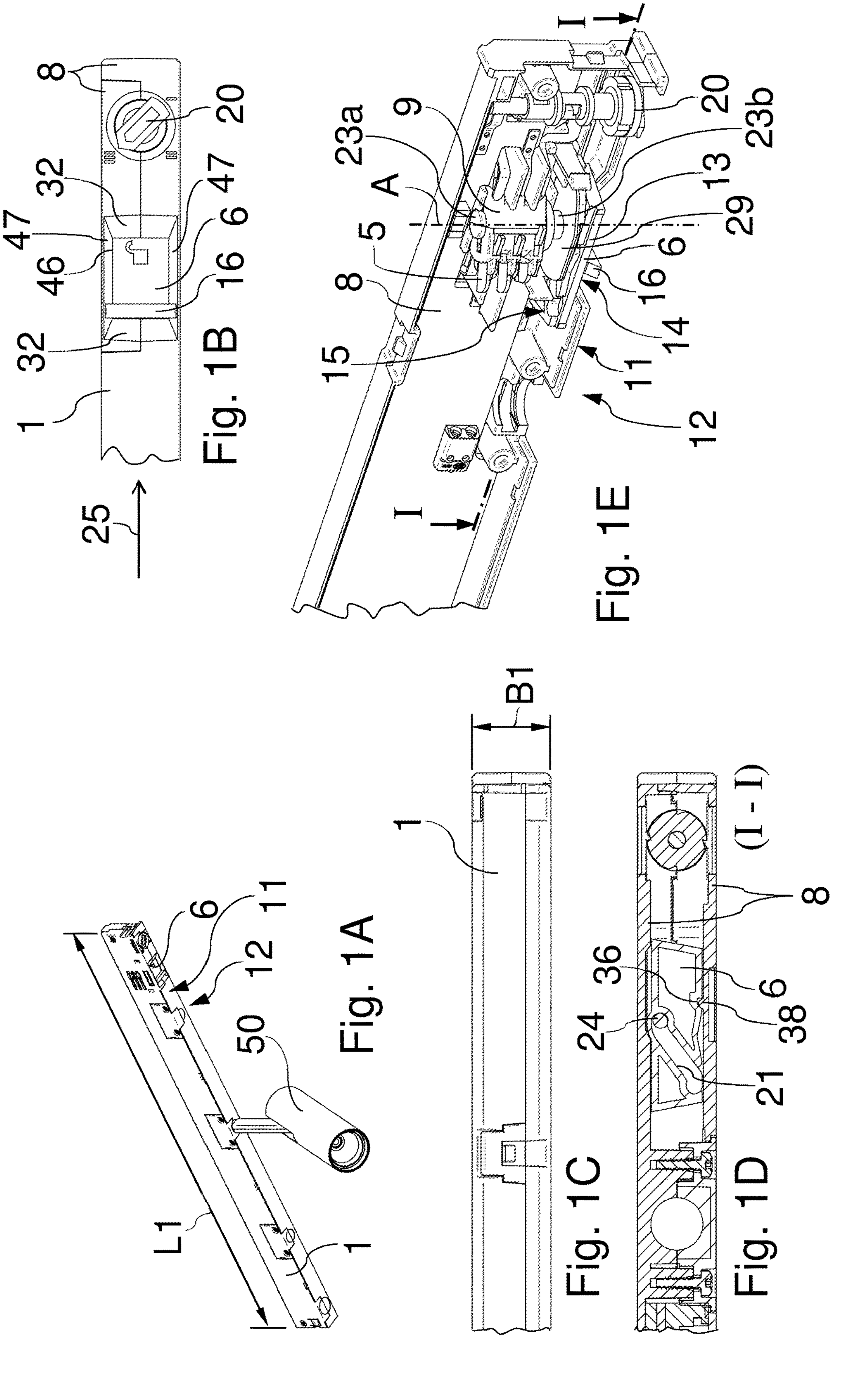
FIG. 1A a perspective view of an adapter according to an exemplary embodiment, in a first state with folded contact elements, wherein the adapter is coupled to an exemplary lighting device.
FIG. 1B a partial view of the adapter of FIG. 1A from a lower side thereof in a horizontal mounting state.
FIG. 1C a top view of part of the adapter of FIG. 1A, from an opposite side thereof as compared to FIG. 1B.
FIG. 1D a longitudinal section I-I through part of the adapter of FIG. 1A in a plane near the underside thereof, see also FIG. 1E.
FIG. 1E a perspective view of a part of the adapter with some components arranged within it, wherein a number of components, half of a case, and the lighting device are not shown.
Figure 2B:
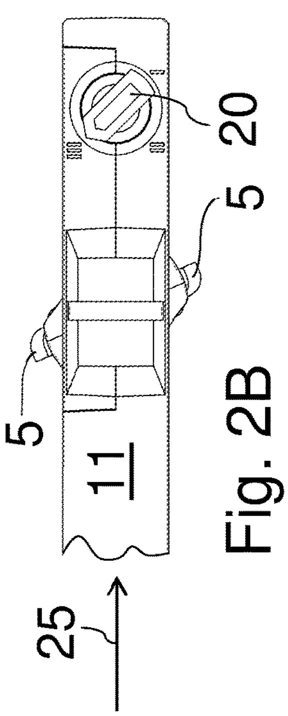
FIGS. 2A-2E the adapter of FIGS. 1A-1E in a second state in which the contact elements are folded out slightly, wherein the views of FIGS. 2A-2E also correspond to the views of FIGS. 1A-1E.
Figure 2E:
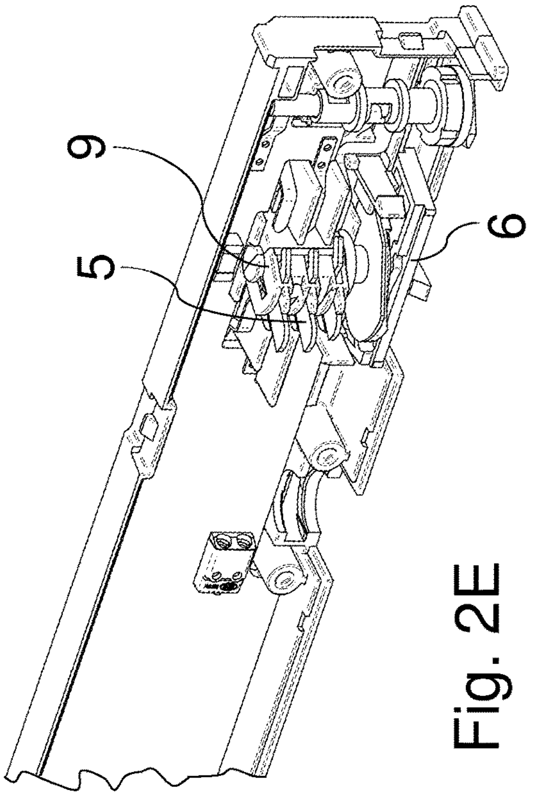
Figure 2A:
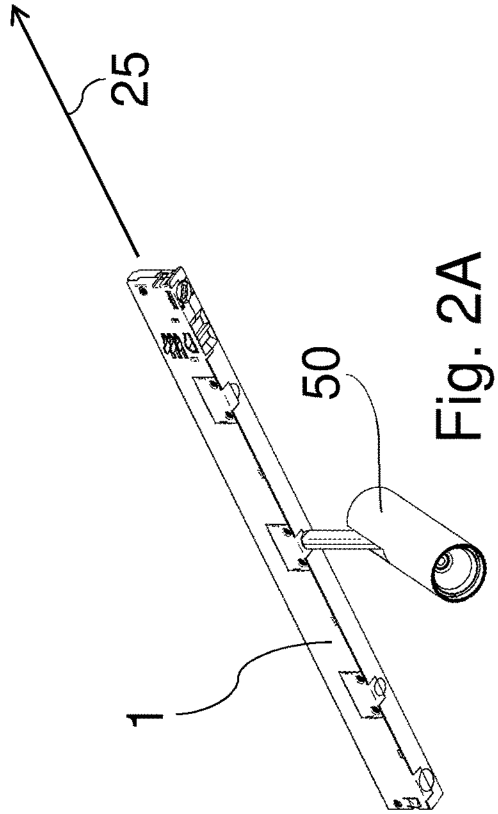
Figure 2C:
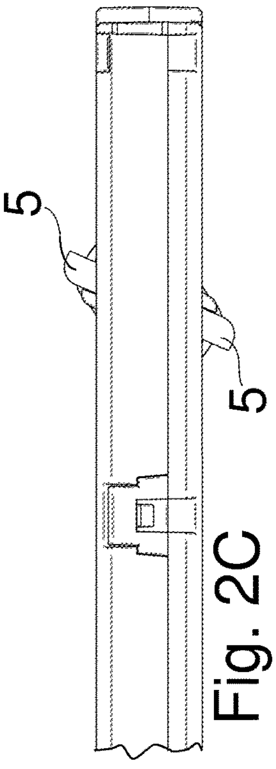
Figure 2D:
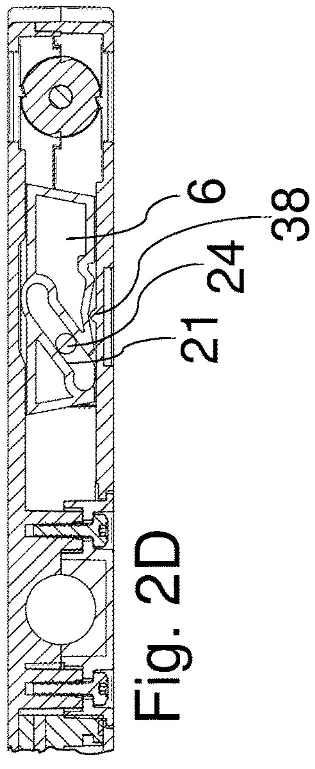
Figure 3B:
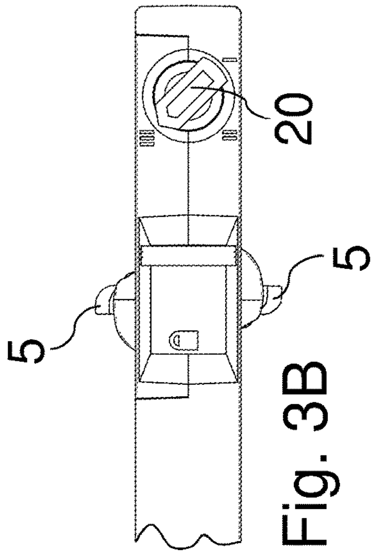
FIGS. 3A-3E the adapter of FIGS. 1A-1E in a third state in which the contact elements are fully unfolded, wherein the views of FIGS. 3A-3E also correspond to those of FIGS. 1A-1E.
Figure 3E:
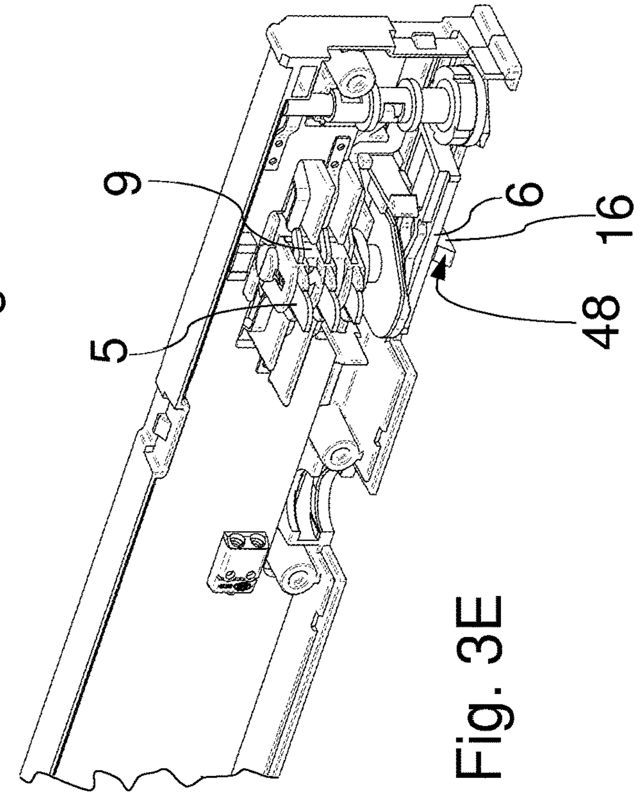
Figure 3A:
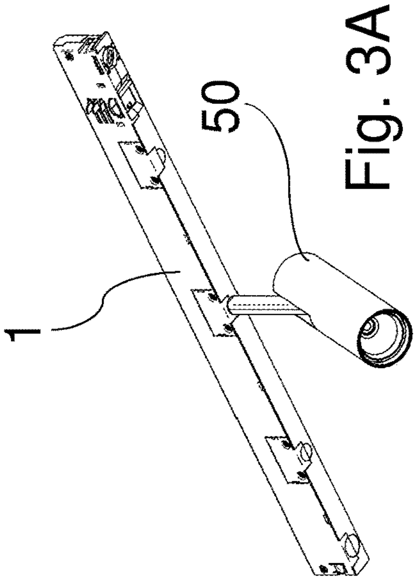
Figure 3C:
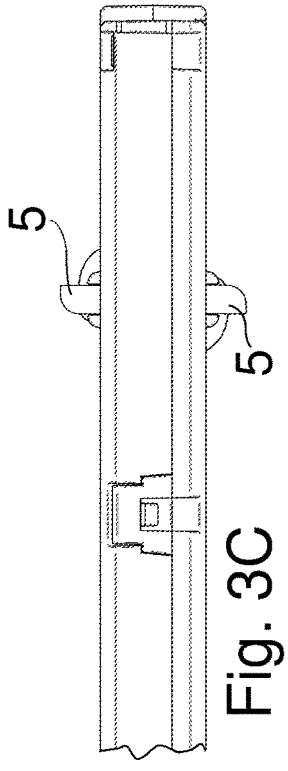
Figure 3D:
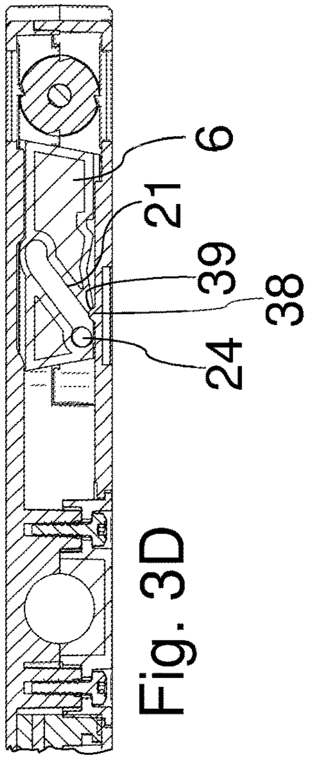
Figure 4:
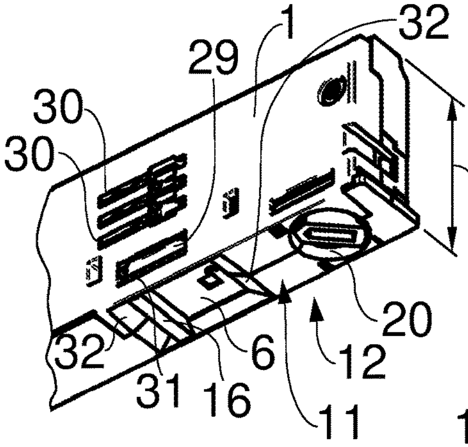
FIG. 4 a detailed view of one end of the adapter of FIG. 1A.

An adapter 1 for use in a track lighting system, for example in an internal space of a building not shown in the figures, is shown in FIGS. 1A to 1E, 2A to 2E and 3A to 3E in different views and in three states. FIG. 4 shows a detail from FIG. 1A.

The adapter 1 is narrow and elongate and, in the exemplary embodiment, has a length L1 of approximately 356 mm, a width B1 of approximately 14 mm and a height H1 of approximately 30 mm, wherein other dimensions are conceivable. The length L1 is measured along a longitudinal direction 25 of the adapter 1, the width B1 and the height H1 each along a width or height direction normal to the direction 25.

In the exemplary embodiment, a spotlight-like lighting device 50 is coupled to the adapter 1 by way of example. The lighting device 50 can be coupled to the adapter 1 in a fixed or detachable manner. Instead of the lighting device 50, a different type of lighting module can be coupled or couplable to the adapter 1 in a fixed or detachable manner. The assembly formed with the lighting device 50 or the lighting module is supplied with electricity by means of the adapter 1 for the operation of light-generating devices of the lighting device 50 or the lighting module. In addition, the lighting device 50 or the lighting module can be controlled by means of the adapter 1 depending on control signals that are received and interpreted by the adapter 1, or the adapter 1 can receive control signals and forward them to the lighting device 50 or the lighting module.

Figure 5:
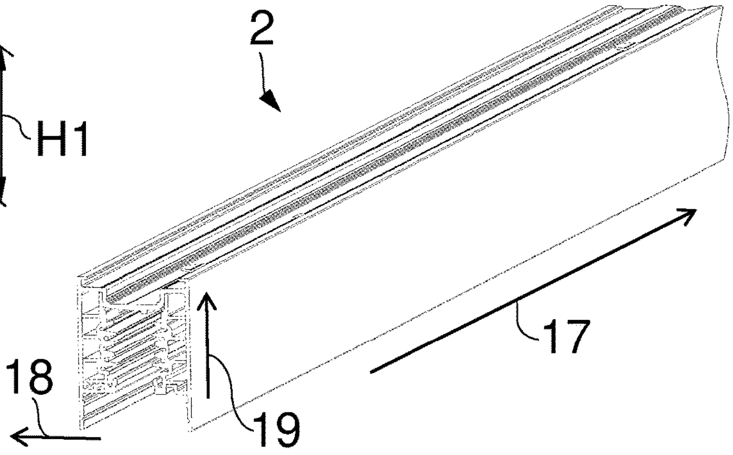
FIG. 5 a perspective view of a track, in which the adapter can be used according to the exemplary embodiment.

The track lighting system, within which the adapter 1 is used, comprises at least one track 2, see FIG. 5, with a longitudinal direction 17 of the track 2, a depth direction 19 of the track 2 normal to the longitudinal direction 17, and a transverse direction 18 of the track 2 normal to the two directions 17 and 19.

The track 2 has a base body 26 which is essentially designed with a U-shaped cross-section and is produced in particular by means of extrusion from a metal material, for example aluminum. Inside the base body 26, inner support profiles 27 are arranged along both legs thereof and are fastened to the base body 26. The carrier sections 27 are preferably made of plastic and, together with a large number of electrical conductors 4, which are accommodated by the carrier sections 27, form an electrical conductor means 3 of the track 2.

Figure 6:
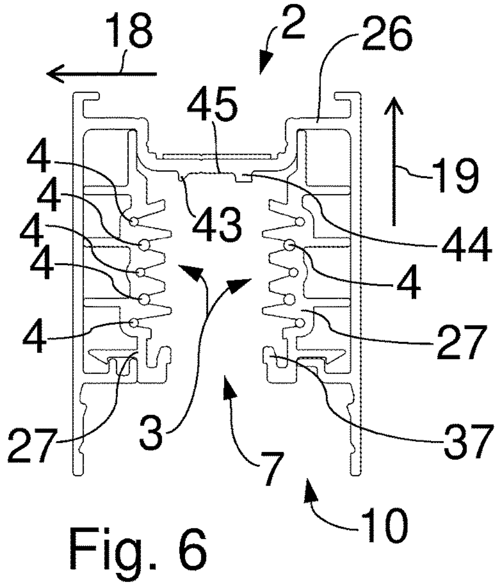
FIG. 6 a cross-sectional view of the track of FIG. 5.
Figure 7:
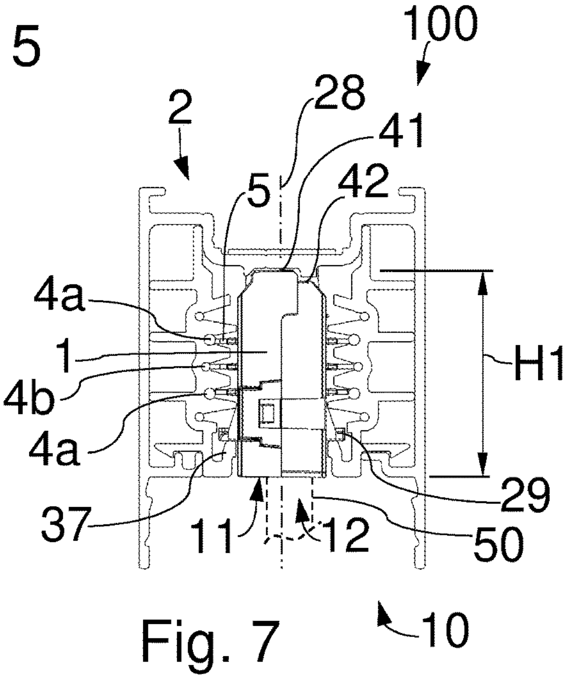
FIG. 7 a cross-sectional view of the track of FIG. 5 with an adapter inserted into the track and an indicated section of a lighting device in a lighting arrangement according to the exemplary embodiment.

The track 2 has, see FIGS. 6 and 7, a free internal space 7 between the two carrier sections 27, within which the adapter 1 can be accommodated.

The adapter 1 can be detachably integrated into the track lighting system in a flush and space-saving manner by inserting it into the internal space 7 of the track 2, wherein the longitudinal direction 25 then runs parallel to the longitudinal direction 17. After being inserted into the internal space 7, the adapter 1 can still be positioned freely in the longitudinal direction 17 and can be easily fixed without tools at a desired point along the track 2 and released again if necessary.

In the exemplary embodiment, one of the conductors 4 of the electrical conductor means 3 serves as a neutral conductor, and several other conductors 4 as phase conductors, which provide several phases of alternating electrical current. In particular, alternating current at mains voltage can be applied to the conductors 4 provided for the power supply. Furthermore, one or more other conductors 4 are also preferably provided to supply a control signal, for example a DALI signal or a signal based on another suitable protocol. Of the conductors 4, two conductors 4*a* and one conductor 4*b* can be provided on each of the two carrier sections 27, wherein the conductor 4*b* are arranged between the conductors 4*a*. The arrangement of the conductors 4*a*, 4*b* in the track 2 is symmetrical to the longitudinal center plane 28 of the track 2, but in FIG. 7 the conductors 4*a*, 4*b* are only designated for one carrier section 27. Three of the conductors 4*a* serve as phase conductors, and a fourth conductor 4*a* serves as neutral conductor. The control signals, for example as a DALI signal, can be supplied by means of the two conductors 4*b*.

The adapter 1 has a frame 8 which, in the exemplary embodiment, is formed with frame shell parts which are locked together. Electrical and electronic components are arranged within the frame 8 and, in cooperation with one another, serve to supply the lighting device 50 or the lighting module with electrical power for operation and to interpret control signals and switch the lighting device 50 or the lighting module on as a function of these control signals, or to forward the control signals to the lighting device 50 or the lighting module for interpretation in the lighting device 50 or in the lighting module. In particular, the adapter 1 can have a converter accommodated in the frame 8.

When the adapter 1 is inserted into the track 2, the conductors 4 run laterally on both sides of the adapter 1, see FIG. 7, and in each case parallel to one another. Several or all of the conductors 4, for example six of the conductors 4 in the figures, can come into contact by means of contact elements 5 of the adapter 1 when the adapter 1 is inserted into the track 2. For this purpose, the contact elements 5 on both longitudinal sides of the adapter 1 can be folded out of the frame 8 and folded back in through the openings 30 provided for this purpose. The contact elements 5 can thus be moved, using a pivoting movement, between a contacting position, in which the contact elements 5 can each come into contact with one of the conductors 4, and a non-contacting position, in which the contact elements 5 are retracted into the frame 8 in such a way that the contact is broken and the adapter 1 can be taken out of or inserted into the track 2.

1A-1E show the adapter 1 in a state in which the contact elements 5 are pivoted completely into the frame 8 in the non-contacting position. 2A-2E show the adapter 1 in a second state, in which the contact elements 5 are between the contacting position and non-contacting position and are partially folded out, and FIGS. 3A-3E show the completely folded out contact elements 5 in their contacting position. The contact elements 5 can all be moved together.

The electrically conductive contact elements 5, see FIGS. 1B, 2B, 3B, 8, are arranged on a body 9 which is rotatably mounted in the frame 8 and is connected to it in a torque-proof manner. The body 9 can be partially cylindrical. In particular, two cylindrical sections can also be provided as a swivel pin 23*a* on one end face of the body 9 and a rotary axis section 23*b* on an opposite side of the body 9 in relation to the contact elements 5, on which the body 9 is mounted in the frame 8 and can be pivoted.

Furthermore, a plate-like fixing element 29 is connected to the body 9 in a torque-proof manner. The fixing element 29 can be a separate part or, as shown in FIGS. 1E-3E and 8, can be formed in one piece with the body 9. While the fixing element 29 is folded into the frame 8 in the non-contacting position of the contact elements 5, see FIG. 1A-1E, the fixing element 29 is in the third state, FIG. 3A-3E, together with the fully folded out contact elements 5 on both sides of the frame 8 through openings 31 provided for this purpose. FIG. 4 shows the slit-like lateral openings 30 in the frame 8 for one of the contact elements 5 and the slit-like opening 31 in the frame 8 for an end section of the fixing element 29.

The track 2 has an open side 10, see FIG. 6, 7, from which the adapter 1 can be inserted into the track 2. The adapter 1 is provided with an actuating element 6 in the area of an outer surface 11 of the adapter 1, which faces the open side 10 when it is in the inserted state. The actuating element 6 is partially essentially flush with the flat outer surface 11 on a side 12 of the adapter 1 facing the open side 10 and partially set back in relation to the surface 11, see FIG. 4, and accessible in sections through an opening 46 in the frame 8 for actuation.

The actuating element 6 serves to bring about the movement of the contact elements 5 between the contacting position and the non-contacting position and the pivoting of the fixing element 29. For this purpose, the actuating element 6 can be manually moved by an operator parallel to the longitudinal direction 25 of the adapter 1 relative to the frame 8. This is illustrated for three positions in FIGS. 1B, 2B, 3B.

Figure 9:
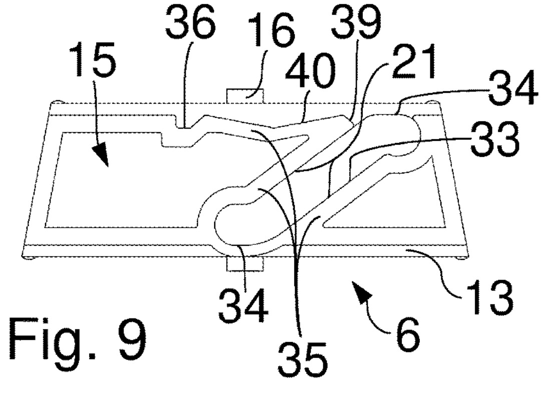
FIG. 9 an actuating element of the adapter according to the exemplary embodiment.

The actuating element 6 is embodied in the manner of an elongated quadrilateral in top view, see FIG. 9, and has a flat plate-shaped section 13 which is formed with a first main surface area 14 and a second main surface area 15. The first main surface area 14 faces outwards in the assembled state of the adapter 1 and points to the side 12 of the adapter 1 and in the direction of the open side 10. A transverse rib 16 projects from the first main surface area 14, the outer surface of which is essentially flush with the outer surface 11. The transverse rib 16 enables the actuating element 6 to be actuated without tools and the operator can reach behind it with their finger in order to move the actuating element 6. For this purpose, the recess 46 in the frame 8, through which the actuating element 6 is accessible on the side 12, can be delimited by beveled side surfaces 32, which facilitate the operator's access to the transverse rib 16 using their finger. Further sloping side surfaces 47 oriented longitudinally on the adapter 1 and delimiting the recess 46 can interact with corresponding faces 48 at the ends of the transverse rib 16 to guide the actuating element 6.

In a variant, instead of the transverse rib 16, or in addition to it, a transverse indentation, which is not shown in the drawing, could be provided in the first main surface area 14 for the operator to grip with their finger.

The second main surface area 15, which is opposite to the first main surface area 14, has a guide contour 21, which, when the adapter 1 is in the assembled state, is designed with an essentially rectilinear middle section 33 that extends obliquely to its longitudinal direction 25, and short end portions 34 which are substantially aligned parallel to the longitudinal direction 25 and are rounded at the end, see FIG. 9. The guide contour 21 is formed in FIG. 9 by a wall 35 that rises up from the second main surface area 15 and surrounds the guide contour 21, wherein an embodiment as a depression in the second main surface area 15 is conceivable. In the mounted state, the guide contour 21 points towards the interior of the frame 8.

Figure 8:
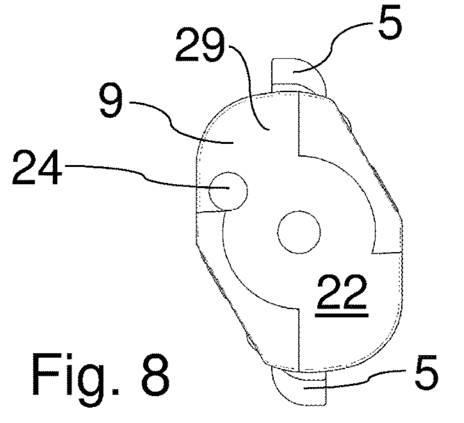
FIG. 8 a body of the adapter according to the exemplary embodiment, with the fixing element and contact elements arranged on the body.

On an end face 22 of the body 9, which is formed in FIG. 8 by one of the main surfaces of the fixing element 29, the latter has a steering projection 24 which protrudes from the end face 22 as a round pin, see FIG. 8. In an embodiment in which the fixing element 29 is a separate element connected in a torque-proof manner to the body 9, the steering projection 24 is thus formed on the separate fixing element 29.

The body 9 with the fixing element 29 and the actuating element 6 are arranged in such a way that the steering projection 24 fits into the groove-like guide contour 21 and can slide in the guide contour 21 . When the actuating element 6 is moved, the guide contour 21 acts on the steering projection 24, which is arranged eccentrically to an axis of rotation A of the body 9 defined by the pin 23*a* and the axle section 23*b*, and thereby causes the body 9 to rotate about the axis of rotation A.

When the operator moves the actuating element 6 after inserting the adapter 1 into the track 2 and positioning it at the desired position along the track 2, the body 9 is rotated, as a result of which the contact elements 5 swing out of the frame 8 through the openings 30 and make contact with several of the conductors 4, see FIG. 7. At the same time, the fixing element 29 pivots out of the frame 8 through the openings 31 on both sides of the adapter 1 and engages on both sides of the adapter 1 behind a section 37 of each of the inner carrier sections 27 that projects into the internal space 7 at the ends pointing towards the open side 10 of the track 2.

In the state of FIGS. 3A-3E, the contact elements 5 make contact with the conductors 4. The contact elements 5 are set up to pick up the electrical supply voltage and/or control signals, such as DALI signals, for the lighting device 50 or a lighting module of a different design from the conductors 4. The adapter 1 is designed to supply the lighting device 50 or the lighting module with electrical power for its operation and either a) to pass on the control signal either to the lighting device 50 or the lighting module, wherein the control signal from the lighting device 50 or the lighting module itself is interpreted, or alternatively b) to interpret the control signal in the adapter 1 and control the lighting device 50 or the lighting module on the basis of the control signal.

When the adapter 1 is inserted, the height H1 extends essentially parallel to the depth direction 19 of the track 2, the width B1 essentially parallel to the transverse direction 18 of the track 2, and the length L1 essentially parallel to the longitudinal direction 17 of the track 2. A narrow adapter 1 is therefore provided, which is used for connection to the conductors 4 running parallel to one another along both profile sides of the track 2 and which can be inserted into the track 2 in a detachable manner. The folding in and out of the contact elements 5 is achieved by means of a rotational movement of the inner body 9, which can be achieved without tools with the aid of a rectilinear movement of the actuating element 6.

Advantageously, the operator can also insert the adapter 1 flush into the internal space 7 in an unfavorable position, for example overhead, without a tool, and can freely position it along the longitudinal direction 17 and at the desired point along the track 2 in a simple manner, by means of linear, rectilinear movement of the actuating element 6 and can thereby detachably secure it and create a connection by simply applying a force in a straight direction using their finger. The adapter 1 can be released by moving the actuating element 6 in the opposite direction, i.e. from the state of FIGS. 3A-3E in the direction of FIGS. 1A-1E. The sliding element 6 as part of the mechanism for bringing the adapter 1 into contact and fixing it in place does not take up any additional space and does not protrude unfavorably from the cross-section of the adapter 1 at any point.

Reference is made to FIG. 9 and FIGS. 1D, 2D, 3D, which show that the wall 35 delimiting the guide contour 21 also continues as a wall which runs along the outer edge of the actuating element 6. Here, adjacent to one of the outer longitudinal edges of the element 6, the wall 35 is designed with a latching recess 36, which can engage in a latching projection 38, which is, for example, provided on the inside of a section of the frame 8 with a smaller wall thickness. The latching recess 36 and the latching projection 38 are preferably arranged relative to one another in such a way that the projection 38 engages in the recess 36 in the first state, in which the contact elements 5 are fully folded in, whereby the actuating element 6 is locked into the position in which adapter 1 is not fixed in or in contact with the track 2, FIG. 1D.

In addition, the wall 35 forms a further latching edge 39 adjacent to a transition between the middle section 33 and one of the end sections 34 and in the area of the same longitudinal side of the element 6 as the latching recess 36. FIG. 3D shows that in the third state, in which the contact elements 5 and the fixing element 29 are fully folded out and the contact elements 5 are in the contacting position, the latching projection 38 of the frame 8 engages behind the latching edge 39 and the actuating element 6 is locked in the third state, i.e. the fixed state of the adapter 1 making contact with the elements.

The latching edge 39 and the latching recess 36 are thus embodied adjacent to one of the longitudinal edges of the actuating element 6 by means of the wall 35 of the latter. Between the latching recess 36 and the latching edge 39, an outer boundary of the wall 35 is provided with a V-shaped contour 40 that slopes flatly inwards in opposite directions in order to facilitate the movement of the latching projection 38 between the two end positions of the actuating element 6 when sliding into the recess 36 or behind the latching edge 39.

Furthermore, 1B, 2B, 3B and 4 show that the adapter 1 is equipped with a device 20 for phase selection. The device 20 is designed as a mechanical rotary switch, which makes it possible to connect the lighting device 50 coupled to the adapter 1 or the lighting module coupled to the adapter 1 with a selectable electrical phase provided by some of the conductors 4 and in contact with contact elements 5. The device 20 thus makes it possible to select a phase which, for example, is used to supply the lighting device 50 or the lighting module with electricity. In particular, it is possible to use the device 20 to avoid selecting any of the phases, and thus to disconnect the lighting device(s) 50 coupled to the adapter 1 or the lighting module(s) coupled or capable of being coupled to the adapter 1 from all of the electrical phases.

In the exemplary embodiment, the adapter 1 has six contact elements 5, so that a connection is not made with all of the available conductors 4. In variants, the number of conductors 4 and/or the contact elements 5 can vary and, for example, can also be the same.

Furthermore, the adapter 1 and the track 2 are designed to ensure that the adapter 1 is always correctly inserted into the track 2 in such a way that the contact elements 5 each come into contact with the intended conductors 4 as desired. For this purpose, see FIGS. 6 and 7, the frame 8 of the adapter 1 is designed asymmetrically in sections in the area of the outer surface of the adapter 1 on the narrow longitudinal side which faces the base of the track 2 connecting the legs of the base body 26. The asymmetry relates to a longitudinal center plane of the adapter 1 which, in FIG. 7 (where the adapter 1 is located in the internal space 7), coincides with the longitudinal center plane 28 of the track 2 in this exemplary embodiment. The adapter 1 has a step-like cross-sectional geometry adjacent to the base of the track 2 in the area of its outer surface, which is arranged asymmetrically to its longitudinal center plane, with an elevation 41 that is laterally displaced relative to the longitudinal center plane, and thus to the plane 28 in FIG. 7. In this way, a recessed area 42 is formed on the side of the elevation 41. The base of the track 2 is embodied on the inside with projections 43 and 44 directed towards the internal space 7 and an intermediate space 45 between the projections 43, 44. The projections 43, 44 are preferably introduced into the base body 26 as longitudinal rib-like sections during extrusion. In cross-section, the groove-like intermediate space 45 corresponds to the elevation 41. Due to the asymmetrical positioning of the elevation 41 and the intermediate space 45, the adapter 1 can only be fully inserted into the internal space 7 in one orientation.

A lighting arrangement 100 can thus be embodied with one or more tracks 2, one or more lighting devices 50 and/or other types of lighting modules, and with at least one adapter 1 or several adapters 1, as described above with reference to FIGS. 1-9, wherein the adapter 1 can connect the lighting unit 50 or the lighting module to the electrical conductor means 3.

Although the present invention has been fully described above with reference to preferred exemplary embodiments, it is not limited to these exemplary embodiments and can be modified in a variety of ways.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding German application No. 102022204265.4, filed Apr. 29, 2022, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

REFERENCE LIST

1 adapter
2 track
3 electrical conductor means
4 conductor
5 contact element (adapter)
6 actuating element (adapter)
7 internal space (track)
8 frame (adapter)
9 body
10 open side (track)
11 outer surface (adapter)
12 side (adapter)
13 plate-shaped section (actuating element)
14 first main surface area
14 second main surface area
16 transverse rib
17 longitudinal direction (track)
18 transverse direction (track)
19 depth direction (track)
20 device for phase selection
21 guide contour
22 end face
**23*a*** swivel pin
**23*b*** rotary axis section
24 steering projection
25 longitudinal direction (adapter)
26 base body (track)
27 carrier section (electrical conductor means)
28 longitudinal center plane
29 fixing element
30 opening
31 opening
32 sloping surface
33 middle section (guide contour)
33 end section (guide contour)
35 wall
36 latching recess
37 section (carrier section)
38 latching projection
39 latching edge
40 V-shaped contour
41 elevation
42 recessed area
43 projection
44 projection
45 intermediate space
46 recess
47 sloping surface
48 sloping surface
50 lighting device
100 lighting arrangement
A axis of rotation
B1 width (adapter)
H1 height (adapter)
L1 length (adapter)

The invention claimed is:

1. Adapter for use in a track lighting system, which is designed to be inserted into a track of the track lighting system, wherein the track has an electrical conductor means with conductors, the adapter has contact elements, and when the adapter is in an inserted state, contact can be made with the conductors by means of the contact elements;

wherein the contact elements can be moved into a contacting position in which they protrude from the adapter in order to make contact with the conductors, and into a non-contacting position in which the adapter can be inserted into or removed from the track;

wherein the movement of the contact elements between the contacting position and the non-contacting position can be brought about by an operator by means of a moveably arranged actuating element of the adapter;

wherein the contact elements are arranged on a body rotatably mounted in a frame of the adapter;

wherein the actuating element has a flat, plate-shaped section, an engagement geometry formed on or in a first main surface area of the plate-shaped section and a guide contour formed in the area of a second main surface area of the plate-shaped section, which is opposite the first main surface area;

wherein a steering projection, arranged eccentrically relative to an axis of rotation of the body, is formed on an end face of the rotatably mounted body or on an element connected in a torque-proof manner to the body and arranged on the front side of the body; and wherein when moving the actuating element, the guide contour acts on the steering projection thereby effecting the rotation of the body.

2. Adapter according to claim 1, wherein the actuating element for moving the contact elements can be actuated by the operator without tools.

3. Adapter according to claim 1, wherein the adapter, by actuating the moveably arranged actuating element used to move the contact elements, is simultaneously detachably fixable to the track at a selectable point along a longitudinal direction of the track in an internal space of the track in which the adapter is accommodated when inserted.

4. Adapter according to claim 1, wherein the actuating element can be displaced in a straight line by the operator.

5. Adapter according to claim 1, wherein the body is designed with an at least partially cylindrical or cylinder-like outer shape.

6. Adapter according to claim 1, wherein the actuating element can be moved relative to the frame of the adapter and the body can be rotated relative to the frame by means of the displacement movement of the actuating element.

7. Adapter according to claim 1,
wherein the engagement geometry embodied on or in the first main surface area of the plate-shaped section is formed with a transverse rib projecting from the first main surface area.

8. Adapter according to claim 1,
wherein the conductors that can come into contact with the contact elements are set up to provide an electrical supply voltage and/or a control signal for lighting devices or lighting modules of the track lighting system and the contact elements are designed to supply the supply voltage or the control signal from the conductors.

9. Adapter according to claim 1,
wherein a length of the adapter, which is essentially parallel to a longitudinal direction of the track when the adapter is in the inserted state, is between 300 mm and 400 mm, a height, which is essentially parallel to a depth direction of the track when the adapter is in an inserted state, is between 20 mm and 40 mm, and a width of the adapter is between 10 mm and 20 mm.

10. Adapter according to claim 1,
wherein the adapter is designed at least in sections with an asymmetrical shape in relation to a longitudinal center plane of the adapter in an outer surface area of the adapter that faces a base of the track when the adapter is inserted.

11. Adapter according to claim 1,
wherein the actuating element is arranged in the region of an outer surface of the adapter facing an open side of the track when the adapter is in the inserted state.

12. Adapter according to claim 11,
wherein the actuating element is arranged flush or set back with respect to a flat surface that forms the outer surface of the adapter on a side of the adapter that faces the open side of the track.

13. Adapter according to claim 1,
wherein the adapter is designed for insertion into the track in such a way that the conductors run laterally of the adapter when the adapter is inserted, and wherein in the contacting position, the contact elements protrude laterally on the adapter.

14. Adapter according to claim 13,
wherein the adapter is designed for insertion into the track in such a way that the conductors run laterally on both sides of the adapter when the adapter is inserted.

15. Adapter according to claim 13,
wherein the conductors, which can be contacted by the contact elements, are arranged parallel to one another.

16. Adapter according to claim 1,
wherein the adapter has a device for phase selection, by means of which an assembly that is or can be coupled to the adapter can be electrically coupled in the contacting position to supply the assembly with an electrical phase selectable from a plurality of electrical phases provided by the electrical conductor means.

17. Adapter according to claim 16,
wherein the assembly that is or can be coupled to the adapter is a lighting device or a lighting module.

18. Adapter according to claim 1,
wherein the adapter is set up to receive a control signal from the electrical conductor means by means of one or more of the contact elements and to interpret the control signal and control an assembly that is or can be coupled to the adapter as a function of the control signal and/or pass the control signal on to an assembly that is or can be coupled to the adapter.

19. Adapter according to claim 18,
wherein the assembly that is or can be coupled to the adapter is a lighting device or a lighting module.

20. Lighting arrangement with
a track,
at least one lighting device or a lighting module, and
at least one adapter according to one of the preceding claims for connecting the lighting device or the lighting module to an electrical conductor means of the track.

* * * * *